United States Patent [19]

Masih

[11] Patent Number: 5,696,971
[45] Date of Patent: Dec. 9, 1997

[54] RECURSIVE FUNCTIONS OPTIMIZIER (RFO) FOR COMPLIERS OF HIGH-LEVEL PROGRAMMING LANGUAGES

[75] Inventor: Rusk Masih, Glastonbury, Conn.

[73] Assignee: Recursive Technologies Associates

[21] Appl. No.: 363,341

[22] Filed: Dec. 23, 1994

[51] Int. Cl.$^6$ ........................................ G06F 9/45
[52] U.S. Cl. .................. 395/700; 395/700; 364/DIG. 1; 364/262.1
[58] Field of Search ............................................. 395/700

[56] References Cited

U.S. PATENT DOCUMENTS 4,295,218 10/1981 Tanner ........................ 371/40

OTHER PUBLICATIONS

"On the Complexity of Table Look up for Iterahire Division", Parhami. B., IEEE Trans. on Computers, vol. C-36 No. 10, Oct. 1987, pp. 1233-1236.

"A Minimum Table Size Result for Higher Radix Nonrestoring Division", Bushard L.B., IEEE Trans. on Computers, vol. C-32 No. 6, Jun. 1983, pp. 521-526.

Primary Examiner—Kevin A. Kriess
Assistant Examiner—Kakali Chaki

[57] ABSTRACT

RFO is a method for preprocessors of compilers of high-level programming languages which have built-in recursive function support. Given the source code, RFO identifies the recursive function and uses a formula to determine the maximum size of the results table which is used to store the intermediate results. When the table is filled, it wraps around, discards the old values, and replaces them with the new ones. An index is used to indicate the position of the latest entries, which are used for the backward search of the table This method results in efficient memory usage as well as shorter time of calculations compared with the standard mechanism provided by the compilers. RFO is independent of the computing machine power or its supporting compiler. This method is advantageous for cases requiring huge processing resources.

1 Claim, 7 Drawing Sheets

|   |
|---|
| 5 |
| 4 |
| 3 |
| 2 ⇐ |

Figure 7a

| X | F(X) |
|---|---|
| ⇒ 1 | 1 |

Figure 7b

|   |
|---|
| 5 |
| 4 |
| 3 |
| 2 ⇒ |

Figure 8a

| X | F(X) |
|---|---|
| 1 | 1 |
| ⇒ 0 | 1 |

Figure 8b

|   |
|---|
| 5 |
| 4 |
| 3 ⇒ |

Figure 9a

| X | F(X) |
|---|---|
| 1 | 1 |
| 0 | 1 |
| ⇒ 2 | 2 |

Figure 9b

|   |
|---|
| 5 |
| 4 |

| X | F(X) |
|---|---|
| 3 | 3 |
| 0 | 1 |
| 2 | 2 |

Figure 10b

| X | F(X) |
|---|---|
| 1 | 1 |
| 0 | 1 |
| 2 | 2 |
| 3 | 3 |

Figure 10c

| X | F(X) |
|---|---|
| 3 | 3 |
| 4 | 5 |
| 2 | 2 |

| X | F(X) |
|---|---|
| 1 | 1 |
| 0 | 1 |
| 2 | 2 |
| 3 | 3 |
| 4 | 5 |

RECURSIVE FUNCTIONS OPTIMIZER (RFO) FOR COMPILERS OF HIGH-LEVEL PROGRAMMING LANGUAGES

FIELD OF THE INVENTION

The present invention relates to digital computing. In particular to a mechanism which is used by COMPILERS to support recursively defined functions in the source code.

BACKGROUND OF THE INVENTION

The distinction between a 'recursive' language such as ALGOL and a 'non recursive' language such as FORTRAN is that in FORTRAN the programmer who wishes to use recursion has to set up the mechanism himself, whereas in ALGOL the mechanism is provided by the system, 'behind the scenes'. Modern programming languages, such as C and PASCAL also support recursive programming; however, the principal algorithm of recursive function computation remains the same ever since the introduction of ALGOL.

Basically a recursive procedure deals with subroutines that call themselves. This means that for each call of the subroutine there must be a different set of working registers and a different place to store the return address. Upon entry to the subroutine a new set of working registers must be allocated. Upon exit the environment (working registers, etc.) must be restored and then control is transferred to the return address. These operations are automatically carried out for recursive functions by a compiler like C, for example, so a programmer can program recursively without any regard to the problems of preserving and restoring working space, etc.

This mechanism of supporting, computing, and handling of recursive functions by a compiler is termed in this document as the STANDARD mechanism.

It is desired to expand and replace this STANDARD mechanism so that repeated execution of the recursive function does not run out of memory and slow down the computing process regardless of the power of the machine it is running on.

DISCUSSION OF PRIOR ART

The present invention is an improvement over a method known as TABLE LOOK-UP which in turn can be argued to be an improvement over the STANDARD mechanism. One of the main disadvantages of the STANDARD mechanism provided by today's compilers is the fact that the value of the recursive function is recomputed every time the function is called even if the function is called with the same arguments. The TABLE LOOK-UP overcomes this disadvantage by saving the result of the recursive function along with its arguments in the results table. Each time a function is called the built-in procedure first checks to see if the result is already in the results table. If it is, the result is taken from the results table instead of computing the function again. This ensures that only the functions that are needed are actually computed, and each is computed only once. Some specialized systems other than compilers provide TABLE LOOK-UP mechanism support.

Usually TABLE LOOK-UP works well when the size of the results table is relatively small. However, during the execution of the recursive function the results table can grow substantially, which will slow down the search in the table look-up and requires large memory resources.

SUMMARY OF THE INVENTION

The main objective of this invention is to improve memory usage and speed of computation over the STANDARD, used by pre RFO Compilers, as well as over the TABLE LOOK-UP methods, used by specialized systems. RFO accomplishes this by using a table lookup and by imposing a limit on the size of the results table to a manageable size. This size is computed according to a formula that is one of the claims in this application. RFO also uses a unique creative scheme to access the limited size results table during its search for a previously computed result pair.

BRIEF DESCRIPTION OF THE DRAWINGS

The features of the invention believed to be novel are set forth with particularity in the appended claims. The invention itself, however, both as to organization and method of operation, together with further objects and advantages thereof, may be best understood by reference to the following drawings in which:

This test was performed on an IBM compatible PC. Although the numbers may vary slightly, the relative difference in speed between the STANDARD method, the TABLE LOOK-UP method, and the RFO method will remain the same.

DETAILED DESCRIPTION OF THE INVENTION

1. According to this invention there exists an upper limit F_MAX_SIZE of the results table F_RESULT_TABLE associated with any recursive function F(), and generally independent of the arguments of F(), that RFO uses to store intermediate results. This size limit is computed to suit the recursive function being computed.

2. RFO behaves as a TABLE LOOK-UP when it writes in the result table, except when RFO reaches the F_MAX_SIZE entry, then it uses a procedure which wraps around and places the latest arguments and result pair in the first entry in the results table thereby changing its previous value which is not needed any more. When the next result is ready RFO continues to write second, third entries . . . etc. until it reaches the F_MAX_SIZE entry again, after which it wraps around one more time and so on. This is different from the TABLE LOOK-UP which simply increments the index in the results table whenever it needs to place the next arguments and result pair in it, thus running out of memory which could be a problem for a large size program.

3. Each time a recursive function is called RFO will first search F_RESULT_TABLE of the function F() for the required argument and its result. RFO will compute and evaluate the function F() if it cannot find it in the F_RESULT_TABLE. RFO uses an index F_index to do the search. F_index holds the latest updated entry in the F_RESULT_TABLE.

Figure 1:
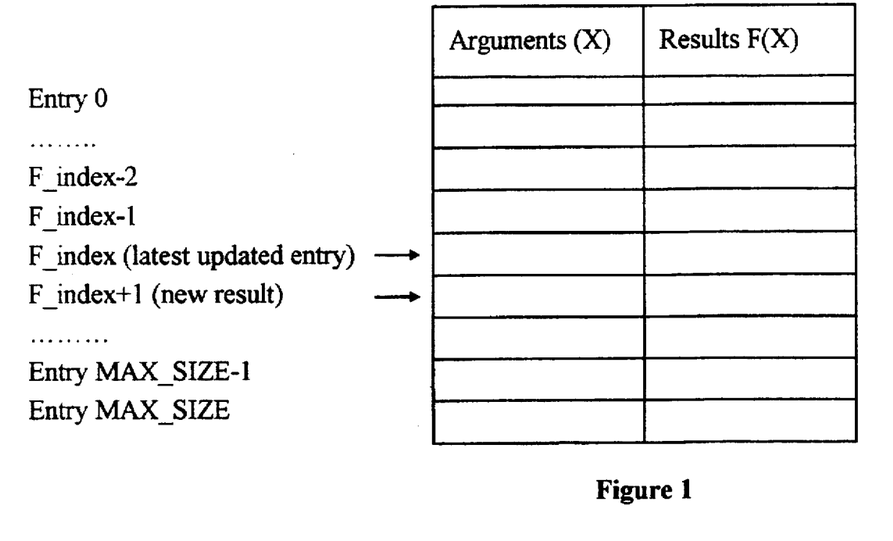
FIG. 1 illustrates how the RFO method searches the Results table.

The order of the search is as follows: Check entry F_index first, then F_index-1, then F_index-2, ..., 0 and then MAX_SIZE, MAX_SIZE-1, MAX_SIZE-2, ..., F_index+1. This is a backward search of the F_RESULT_ TABLE from the current entry point at location F_index. When the result is not found F_index is increased by one to F_index+1 and the new computed result is placed there. See FIG. (1).

4. RFO constructs the F_MAX_SIZE in accordance with the following scheme: A Recursive function is generally defined as a set of conditions and corresponding expressions:

$$F(X) = \begin{vmatrix} \text{Expression}(1) & \text{if Condition}(1) \text{ is TRUE} \\ \text{Expression}(2) & \text{if Condition}(2) \text{ is TRUE} \\ \ldots \\ \text{Expression}(i) & \text{if Condition}(i) \text{ is TRUE} \\ \ldots \\ \text{Expression}(N) & \text{if Condition}(N) \text{ is TRUE} \end{vmatrix}$$

If E(i) is the number of occurrences of the recursive function F() in Expression(i) where i=1, ... N and C(i) is a number of appearances of the recursive function F() in Condition(i) where i=1 , ... N then $F\_MAX\_SIZE = Max(E(i), C(i)) + 1$ where $i=1, \ldots, N$ This FACT is illustrated using the well known Fibonacci function as an example:

$$F(x) = \begin{cases} F(x-1) + F(x-2) & \text{if } x > 1 \\ 1 & \text{otherwise} \end{cases}$$

The following analysis makes the case clear:

Expression (1)   is $F(x-1) + F(x-2)$   and   Condition (1) is $x > 1$
Expression (2)   is 1                   and   Condition (2) is otherwise
It follows that  $E(1) = 2$   $C(1) = 0$
                 $E(2) = 0$   $C(2) = 0$ Therefore F_MAX_SIZE for the Fibonacci function is:

$F\_MAX\_SIZE = Max(E(1), C(1), E(2), C(2)) + 1$
$= Max(2, 0, 0, 0) + 1 = 2 + 1 = 3$

This means that the result table, F_RESULT_TABLE, for the Fibonacci function can be as small as 3 entries regardless of the value of the argument X.

Similar computations can be made for other recursive functions such as the Ackermann, the Bessel, and others.

The following will illustrate in detail the application of the RFO method as described above to compute the RECURSIVE Fibonacci function for X=5. It will also compare how each of the other methods, the STANDARD and the TABLE LOOK-UP, will compute the same.

The demonstrated principles can be applied to any value of the input argument X, and that the RFO method can be applied to any other recursive function.

RFO Versus the STANDARD Method

Figure 2:
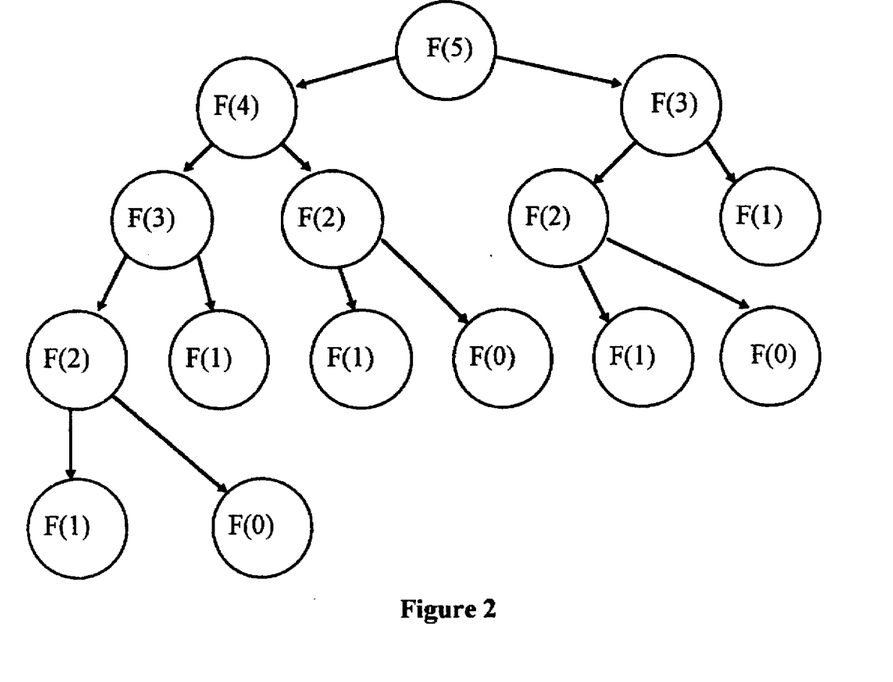
FIG. 2 is the Fibonacci Recursive function tree for computing Fibonacci with argument 5, i.e. F(5).

The shortcomings of modem compilers which use the STANDARD method of computing recursive functions are illustrated very well by the Fibonacci function computation. FIG. (2) demonstrates the calling sequence which a compiler will build for computing F(5). The STANDARD method always uses the left branch of the tree when building a calling sequence. Note that in the process of computing F(5), F(3) will be called 2 times, F(2) 3 times, F(1) 5 times, etc . .. A total of 15 calls will be required to compute F(5), 21891 calls to compute F(20), 331, 160, 281 calls to compute F(40), and the number of calls grows exponentially. This consideration, along with the fact that STANDARD method allocates memory for each call thus running out of memory which makes the method totally impractical.

RFO Versus the TABLE LOOK-UP Method

The comparison between the TABLE LOOK-UP and RFO methods in evaluating the Fibonacci function for argument X=5 is presented in the following steps:

Step 1: F(5)=F(4)+F(3)

Figure 3:
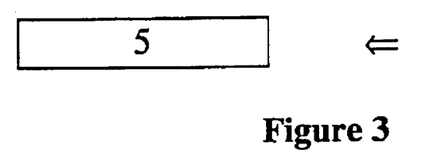
FIGS. 3–6, 7a–7b, 8a–8b, 9a–9b, 10a–10c and 11a–11c illustrate how F(5) is computed by the RFO method and how this is different from the TABLE LOOK-UP method.

The value of F(5) depends on the values of F(4) and F(3). The order of evaluation implemented by most compilers is to call the left innermost function:

a) X=5 will be pushed onto the argument stack as shown in FIG. 3.
b) Function F(4) will be called.

Figure 4:
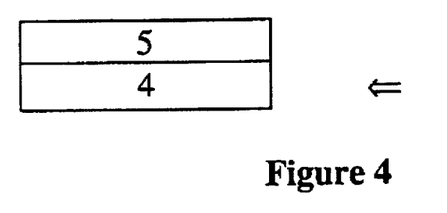

Step 2: F(4)=F(3)+F(2)

a) X=4 will be pushed onto the argument stack, as in step 1 above and as shown in FIG. 4.
b) Function F(3) will be called.

Figure 5:
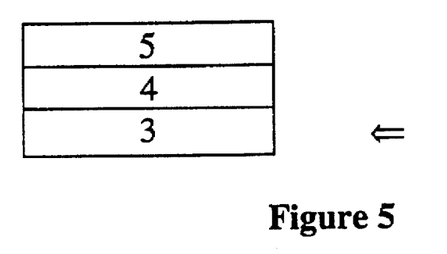

Step 3: F(3)=F(2)+F(1)

a) X=3 will be pushed onto the argument stack as shown in FIG. 5.
b) Function F(2) will be called.

Figure 6:
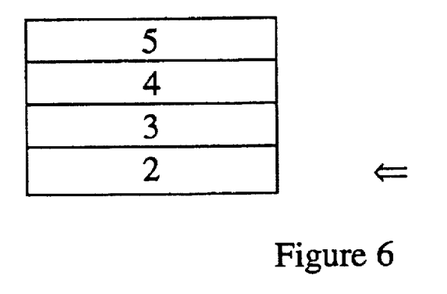

Step 4: F(2)=F(1)+F(O)

a) X=2 will be pushed onto the argument stack as shown in FIG. 6.
b) Function F(1) will be called.

Figure 7A:
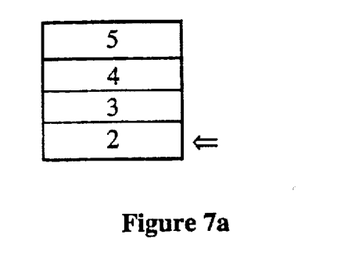
Figure 7B:
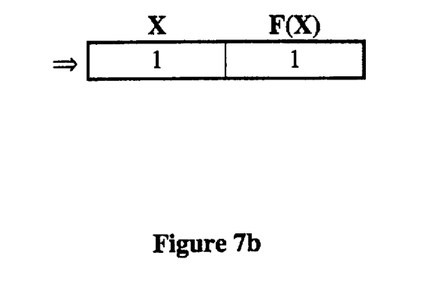

Step 5: F(1)=1, by definition of Fibonacci F(1)=1 a) F(1)=1 will be stored in the result table
b) The next function called is F(0) based on the standard compiler evaluation procedures. The arguments and the results are shown in FIG. 7a and 7b.

Step 6: F(0)=1, by definition of Fibonacci F(0)=1 a) F(0)=1 will be stored in the result table, as shown in FIG. 8(b).
b) Since the evaluation of F(1)+F(0) is complete the next argument will be popped from the argument stack (which is 2), and F(2) will be called.

Figure 8A:
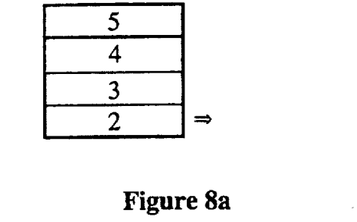
Figure 8B:
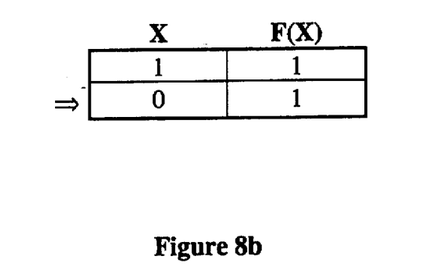

The arguments and the results are shown in FIG. 8a and 8b.

Step 7: F(2)=F(1)+F(0)=1+1=2

Figure 9A:
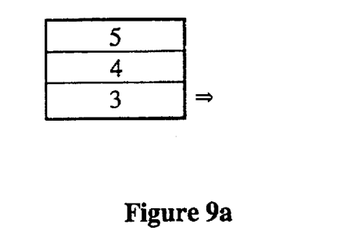
Figure 9B:
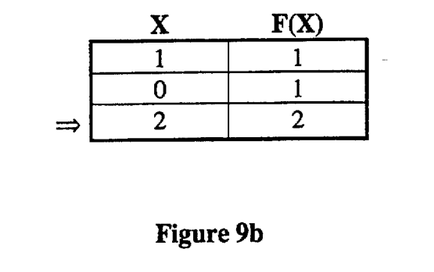

Since F(1) and F(0) are in the result table the value of F(2) can be obtained directly (without recursive calls)

a) F(2)=2 is stored in the result table as shown in FIG. 9(b).
b) The next argument from the argument stack (which is 3), will be popped and F(3) will be called.

The arguments and the results are shown in FIG. 9a and 9b.

Step 8: F(3)=F(2)+F(1)=2+1=3

Since F(2) and F(1) are in the result table the value of F(3) can be obtained directly.

a) F(3)=3 will be stored in the result table
b) The next argument from the argument stack (which is 4), will be popped and F(4) will be called.

Figure 10A:
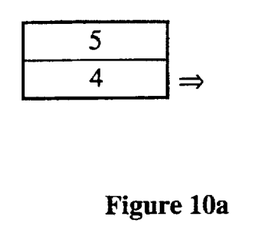
Figure 10B:
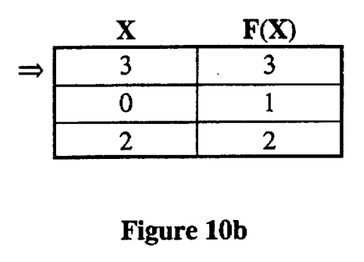

The arguments and the results are shown in FIG. 10a and 10b.

Figure 10C:
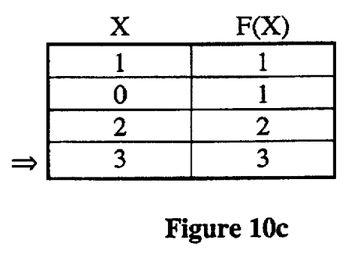

If the conventional method is applied for storing F(3)=3 in the result table an additional space for this record should be allocated, as shown in FIG. 10(c).

According to the newly invented RFO algorithm, an additional space is not allocated for F(3)=3. Instead, it is written in the place of the first record of the results table as shown in FIG. 10(b). This illustrates the wrap around fact claimed in Item 2 of the Detailed Description section.

Accordingly, the conventional look-up table becomes an Unlimited Result Table (URT), FIG. 10(c), while the RFO result table stays—Limited Result Table (LRT), as shown in FIG. 10(b).

Step 9: F(4)=F(3)+F(2)

It can be seen that URT and LRT keep the values of F(3) and F(2) so that F(4) can be calculated directly $$F(4)=F(3)+F(2)=3+2=4$$

a) F(4)=4 is stored according to the RFO-LRT algorithm (overwrite the (0,1) pair).

b) The next argument is popped from the argument stack (which is 5), then F(5) is called.

Figure 11A:
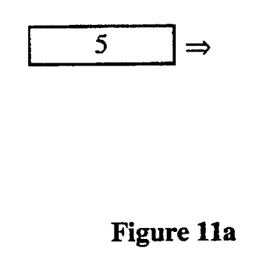
Figure 11B:
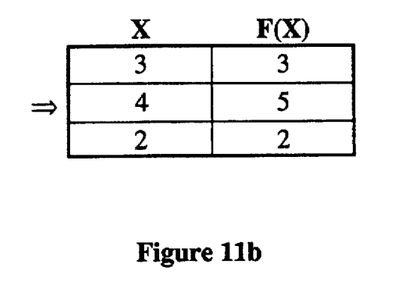
Figure 11C:
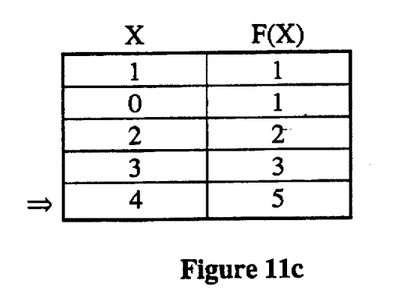
Figure 12:
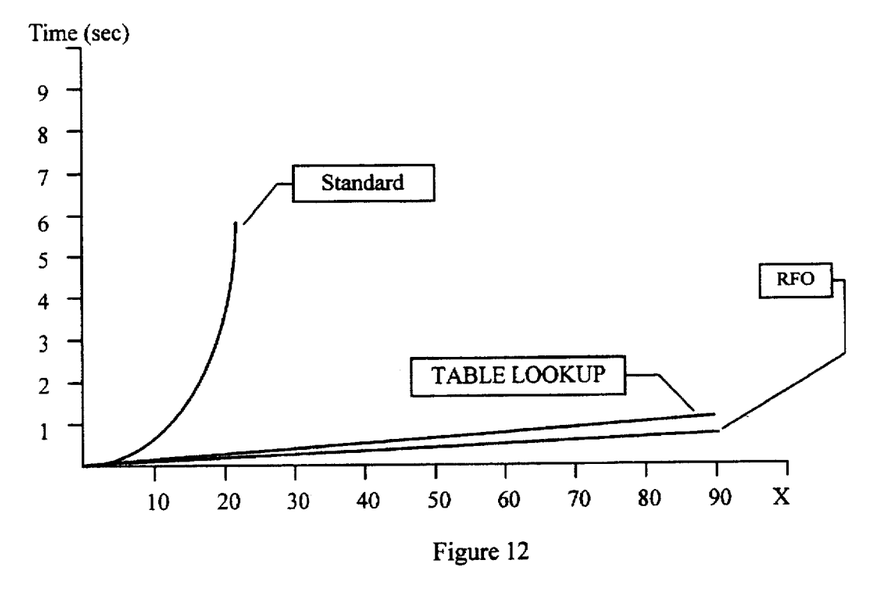
FIG. 12 shows the difference in speed to compute the Fibonacci Recursive function with argument x. As the argument x grows the RFO method is clearly faster than the TABLE LOOK-UP method. The STANDARD method is the slowest by far.
Figure 13:
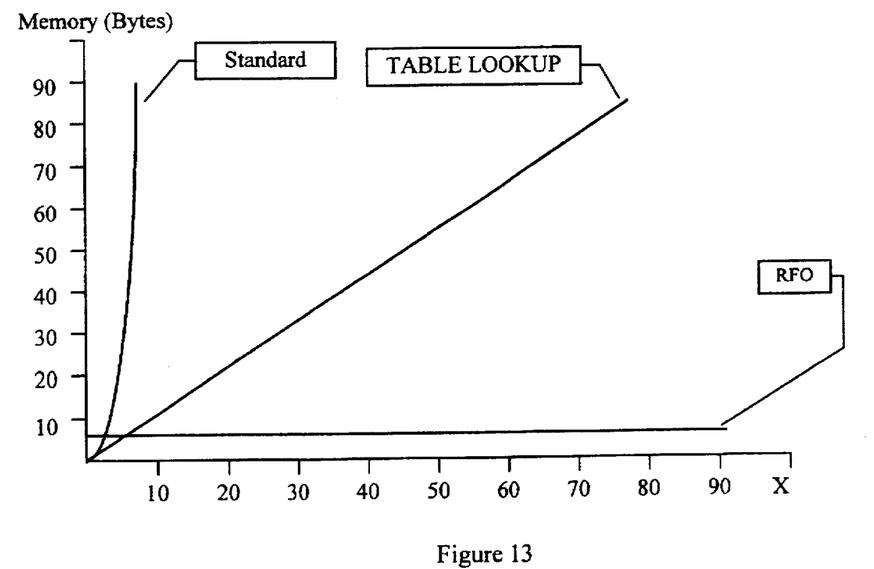
FIG. 13 illustrates how each of the three methods compared uses memory. It is clear that the memory usage in the RFO method remains constant as the argument grows, while the TABLE LOOK-UP method requires a linear unlimited increase as its argument grows. The STANDARD method memory usage grows exponentially as the argument grows.
Figure 14:
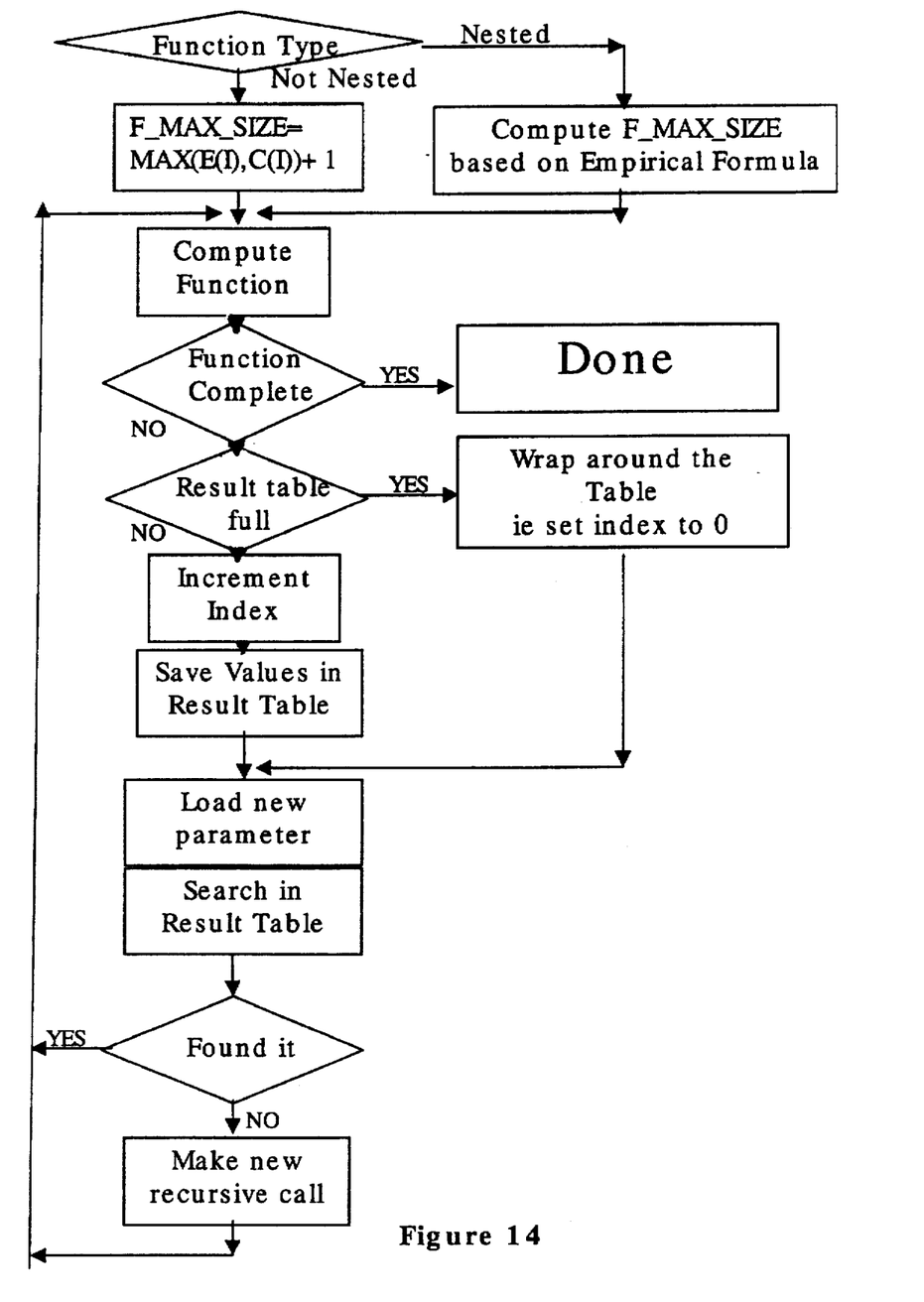
FIG. 14 is a flow chart representing the method of the present invention.

The arguments and the results are shown in FIG. 11(a), (b), and (c).

Step 10: F(5)=F(4)+F(3)

Again, it can be seen that each of the two methods, the conventional URT and the RFO-LRT keep all necessary values, namely F(4) and F(3) so that F(5) can be calculated directly $$F(5)=F(4)+F(3)=5+3=8$$

End of Calculations

It is clear that in order to compute F(5) the conventional TABLE LOOK-UP method requires 5 entries in the result table while RFO requires only 3.

While for F(5) this may not be impressive, the advantage of the RFO method becomes apparent when the value of the argument X becomes very large. For example, for the Fibonacci Recursive Function, in order to compute F(1000) the conventional TABLE LOOK-UP method requires 1000 entries in the result table while the new RFO method still requires only 3.

It is therefore concluded that RFO method is superior to the TABLE LOOK-UP method in memory consumption. Practically it also means a faster computation since RFO method generally deals with smaller RESULT TABLES (searching a table with 3 entries generally requires less time than searching a table with 1000 entries).

NESTED RECURSIVE CALLS

The formula F_MAX_SIZE=Max(E(i),C(i))+1 where i=1, . . . , N is used by the RFO method to compute the recursive function F only if there are no nested recursive functions in the definition of F such as shown below:

$$F(x) = \begin{cases} F(F(x-1)) + F(x-2) & \text{if } x > 1 \\ 1 & \text{otherwise} \end{cases}$$

Nested recursive call

When computing nested recursive functions, RFO will set the size F_MAX_SIZE of the results table to a value which will utilize all available memory resources. When the results table is filled, RFO reuses the results table by wrapping around and will continue for ever as described earlier. The value of F_MAX_SIZE can be adjusted by the user.

While the invention has been particularly described with reference to preferred embodiments thereof, it will be understood by those skilled in the art that various changes in form and details may be made therein without departing from the spirit and scope of the invention.

FIELD OF APPLICATION OF THE INVENTION

The RFO method is superior to the conventional method used by today's COMPILERS. It is also superior to the TABLE LOOK-UP method because its results table size stays a/ways small compared to the size of the results table of the TABLE LOOK-UP method. Small tables take less time to search and less memory to store. Therefore:

1. All existing COMPILERS, that support recursion, can use the RFO method to calculate any Recursive Function.

2. The RFO method can be used to compute ANY Recursive Function including the functions that appear in digital signal processing, e.g. Image Compression and Processing, Speech recognition and Processing, Wavelet Processing, since such programs use Recursive functions extensively.

3. The RFO method can be used to compute functions that occur in Industrial Process Control with multiple feedback systems.

4. The RFO method can be used to compute functions in medical research and chemical processes, where the strain of viruses and the chemical process can be simulated recursively.

5. The RFO method can be used to compute functions in weather trend forecasting, which is a recursive process simulating recursive functions.

6. The RFO method can be used to compute functions in Neural Networks since such functions are extensively recursive.

What is claimed is:

1. A computer-implemented method, in a compiler of computing Recursive Functions wherein a recursive function is defined as a set of conditions Condition(i) and a set of corresponding expressions Expression(i) where i=1, . . . , N, the method comprising the steps of:

a) identifying the Recursive function type and its parameters in a given computer program;

b) determining the maximum size of a results table for storing intermediate results by using the formula b1) Max size=Max(E(i), C(i))+1 where i=1, . . . , N, E(i)=number of occurrences of the recursive function in the expression Expression(i) and C(i) is the number of occurrences of the recursive function in the condition Condition(i), when the recursive function is not nested; and b2) when the recursive function is nested, compute size of the results table based on an empirical value which can be adjusted by a user;

c) saving the computed results in the results table until it is filled;

c) after the table is filled, wrapping around the new computer results, by discarding the old results, and replacing them with the newly computed values;

e) searching the results table every time the recursive function is called for computation by e1) using a search order which starts from the latest entry in the results table and going backward to reduce the search time, and e2) using an index to indicate the position of the latest entry, and e3) incrementing the index to indicate the position of the latest entry in the table.

* * * * *